United States Patent [19]

Hataya et al.

[11] E Patent Number: Re. 33,006

[45] Reissued Date of Patent: Aug. 1, 1989

[54] FEED-WATER HEATER COMPRISING LOW C-CR-MO STEEL COMPONENTS USED UNDER WET STEAM

[75] Inventors: Fumio Hataya, Hitachi; Masakiyo Izumiya, Mito; Yoshikuni Ohshima, Hitachi; Koichi Akutsu, Ibaragi; Syuzo Ueda; Masaaki Ishikawa, both of Chiba; Yuji Kusuhara, Kurashiki; Iwao Shiraishi, Chiba, all of Japan

[73] Assignees: Hitachi, Ltd., Tokyo; Kawasaki Steel Corporation, Kobe, both of Japan

[21] Appl. No.: 71,709

[22] Filed: Jul. 8, 1987

Related U.S. Patent Documents

Reissue of:

[64] Patent No.: 4,529,454
Issued: Jul. 16, 1985
Appl. No.: 351,752
Filed: Feb. 24, 1982

[30] Foreign Application Priority Data

Feb. 27, 1981 [JP] Japan ..... 56-26972
Feb. 27, 1981 [JP] Japan ..... 56-26976

[51] Int. Cl.[4] ..... F28F 19/06

[52] U.S. Cl. ..... 165/134.1; 165/905; 122/DIG. 13; 148/334; 148/335

[58] Field of Search ..... 122/DIG. 13, 412, 451 R; 165/DIG. 905, 134.1; 148/334, 335; 420/105, 106, 108, 109

[56] References Cited

U.S. PATENT DOCUMENTS 2,968,549 1/1986 Brady et al. ..... 420/104
3,251,682 5/1966 Wada ..... 420/105
3,271,138 3/1962 Ohtake et al. ..... 420/104

FOREIGN PATENT DOCUMENTS 0072156 6/1981 Japan .
1200423 7/1970 United Kingdom .

*Primary Examiner*—Deborah Yee
*Attorney, Agent, or Firm*—Balogh, Osann, Kramer, Dvorak, Genova & Traub

[57] ABSTRACT

A novel low C-Cr-Mo steel having an excellent weldability and a high erosion-corrosion resistance under wet steam, which consists of, in % by weight, 0.02–0.14% of C, not more than 0.90% of Si, 0.30–0.80% of Mn, 0.70–1.60% of Cr, 0.40–0.70% of Mo and the remainder being susbtantially Fe. This novel steel is a very excellent material for fabricating the portions in the feed-water heater, for example, for a nuclear power generation plant, the portions being used under wet steam condition. The above described weldability and erosion-corrosion resistance can be improved, by additionally adding the second components of Cu, N, or B, the third components of Nb or V or the fourth components of Al, Ti or Zr in the respectively defined amounts.

14 Claims, 9 Drawing Sheets

FEED-WATER HEATER COMPRISING LOW C-CR-MO STEEL COMPONENTS USED UNDER WET STEAM

Matter enclosed in heavy brackets [ ] appears in the original patent but forms no part of this reissue specification; matter printed in italics indicates the additions made by reissue.

The present invention relates to novel low C-Cr-Mo steel used under wet steam and particularly improvement of a feed-water heater for a nuclear power generation plant, for which such a steel is used.

The term "wet steam" used herein means wet steam or a condensate at a high temperature, when devices to be used in wet steam, for example, a surface in a shell of a closed vessel, such as the feed-water heater for the above described nuclear power generation plant, are subjected to erosion-corrosion owing to a flow movement at a high rate of steam-liquid double phase flow at a high temperature, the eroded substances formed by the erosion-corrosion are circulated in a nuclear reactor system, whereby a problem that the total system is affected by radiation injury, is caused, and further there is a problem that the reliability of the feed-water heater itself is lowered by the erosion-corrosion. As the means for solving these problems, firstly it can be considered in view of design that the flow rate in the total system is lowered, that is a diameter of the shell of the feed-water heater and a diameter of pipes in the piping are increased to lower the flow rate and secondly it can be considered in view of the material that steels having high erosion-corrosion resistance (referred to as "E.C. resistance" hereinafter) are used. The former lowering of the flow rate of the fluid in the system results into the increase of the size of the plant and an amount of steel used is increased and consequently the material cost and the construction cost are increased.

The inventors have analyzed and checked a large number of prior knowledge and results of studies concerning the erosion-corrosion and have concluded that among the standard scopes of the chemical composition of JIS G4109, SCMV-3 (usual name 1¼%Cr-½% Mo-¾% Si steel) shown in Table 1, the heat treatment [normalizing and tempering (abbreviated as "N-T" hereinafter) and annealing "A" hereinafter)] and the mechanical properties (high strength level and low strength level concerning steel N-T and steel A respectively), high strength level of 1¼%Cr-½%Mo-¾% Si steels in which the carbon content is limited to 0.15–0.17% near the upper limit of the standard and the heat treatment is limited to N-T, are ones having an excellent E.C. resistance suitable for the feed-water heater, and the properties are actually confirmed in the experiment and it has been found that high C-1¼%Cr-½%Mo-¾%Si steels are excellent as the materials for the above described feed-water heater in order to more improve the safety of the nuclear power generation plant.

TABLE 1

| | Standard of JIS G4109 SCMV-3 | | | | | | | | | |
|---|---|---|---|---|---|---|---|---|---|---|
| | Chemical composition (weight %) | | | | | Heat treatment | Yield point (kgf/mm²) | Tensile strength (kgf/mm²) | Elongation (%) | Note |
| | C | Si | Mn | Cr | Mo | | | | | |
| SCMV-3 | ≦0.17 | 0.50 to 0.80 | 0.40 to 0.65 | 1.00 to 1.50 | 0.45 to 0.65 | Normalizing-tempering | ≧32 | 53 to 67 | ≧22 | High strength level steel |
| | | | | | | Annealing | ≧24 | 42 to 60 | ≧22 | Low strength level steel |

One of the reason why such steels having C content of not less than 0.15% are applied, is that it is necessary to give the hardness to the steels in order to ensure the high E.C. resistance and another reason is that among SCMV-3, particularly the standard of N-T steels, that is a high tensile strength (for example, more than 53 kgf/mm²of tensile strength) is guaranteed.

However, when the high C-1¼%Cr-½%Mo-¾% Si steels are used in order to improve the E.C. resistance of the feed-water heater for the nuclear power generation plant, such steels are poor in the weldability, so that such steels have a number of problems.

The above described feed-water heater is mainly assembled by forming and welding steel plates but the high C-1¼%Cr-½%Mo-¾%Si steels readily cause weld cracks as seen from the fact that the weld hardenability index, C equivalent (C+Si/24+Mn/6+Ni/40+Cr/5-+Mo/4+V/14 is 0.72% for example and the weld cracking sensitivity index, $P_{CM}$ value (C+Si/30+Mn/20+Cu/20Ni/60+Cr/20-+Mo/15+V/10+5B) is 0.32% for example, so that in order to avoid the weld cracking, it is necessary to particularly carefully effect the preheating and the post-heating and further to effect the annealing (generally referred to as "stress relieving" and abbreviated as "SR") for decreasing stress after welding at a possibly high temperature for a long time. But, this careful preheating is that the portion to be welded is heated to a temperature of about 250° C. with a gas burner and therefore the weld operating environment is made worse and the welding efficiency is lowered and the energy consumption due to gas burner is conspicuous. Thus, in order to increase the amount of energy saved and improve the operating environment and the welding efficiency in building up the feed-water heater for the nuclear power generation plant, the development of Cr-MO steels having a low weld crack sensitivity is very important.

Thus, it is an essential requirement that the high E.C. resistance against wet steam and the strength and toughness suitable for the feed-water heater are obtained. Concerning this E.C. resistance, the previously used high C-1¼%Cr-½%Mo-¾%Si steels are not necessarily satisfactory and considering the durable life of the vessel and the safety of the operation, an improvement is needed.

In a thermal power or nuclear power generation plant, multi-stage of feed-water heaters which heat water to be fed to a boiler or reactor and improve the heat efficiency of the total plant, are used.

The materials for constructing the feed-water heater in the thermal power and nuclear power generation plants are mainly carbon steel. The carbon steel usually used is generally relatively high in the erosion and corrosion resistance when pH value of the contacting fluid is high (pH: more than 9.0) and the contacting fluid is dry steam but when pH value of the contacting fluid is low (lower than 9.0 or neutral at about 7.0) and the steam is wet, the erosion resistance is lowered and the shell or the inner structures, particularly pipes may be eroded and corroded. In addition, when the flow rate of the flowing fluid is high, the erosion and corrosion are accelerated.

The invention will now be described with reference to the accompanying drawings, wherein.

Figure 1:
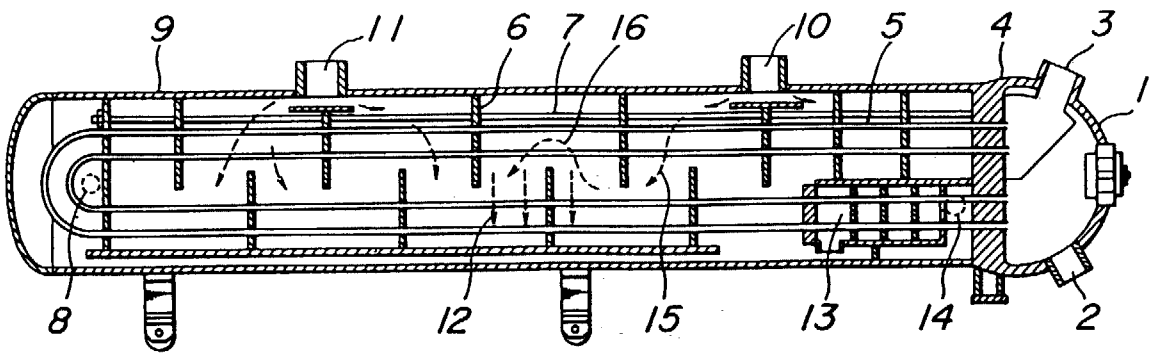
FIG. 1 is a sectional view of the feed-water heater.

In FIG. 1, the feed-water is charged into a water chamber 1 from a feed-water inlet 2 and passed through heat exchanging tubes 5 and discharged from a feed-water outlet 3. The heat exchanging tubes are provided in a large number, form a tube group and open through a tube plate 4 to the water chamber 1 and are supported with tube support plates 6 and tie rods 7 to the shell 9. Heated steam extracted from a turbine is charged into the heater through the steam inlet 10 and a condensate which has finished the heating function in a heater arranged at a higher pressure side than the heater mentioned above, is charged into the heater through a drain inlet 11. These heating fluids come in contact with the surface of each tube 5 of the tube group and effect the heat exchange with the feed-water flowing in the tubes and are condensed to form drain 12, which is stored at a bottom portion in the heater and discharged from a drain outlet 14 through a drain cooler zone 13. Uncondensed gas entrapped with the heating fluids and flowed in the heater, is flowed in the heater together with the flows 15 and 16 of the heating fluids while the flow direction being guided with the tube support plates 6 and discharged out of the heater through an outlet 8 for the uncondensed gas provided at the terminal end of the shell.

After the heating fluids are flowed into the heater through the steam inlet 10 and the drain inlet 11, the total amount of said fluids flows along a serpentine flow passage formed with the tube support plates, so that the flow rate is fairly fast. In addition, since the constructing material is carbon steel, when the steam water mixture flowed through the drain inlet 11 and the heated steam flowed through the steam inlet 10 and a fluid having a low pH value, the erosion and corrosion progress and the thickness of the shell, the heat exchanging tubes and the support plates is reduced. This reduction of thickness is a novel phenomenon which has never been experienced and the ambient temperature is within a range of about 100° C.-200° C. and the clear pattern where the thickness of carbon steel is reduced, is developed on the surface of the carbon steel and when the rate of reducing the carbon steel thickness is as fast as 1.4 mm/year, the reliability of the heater is considerably lowered. In general, the carbon steel shows any corrosion phenomenon with lapse of time, so that it is planned that a superfluous steel thickness for compensating the corrosion is applied top the heater or a stainless steel is used for attaining the completeness, but the above described thickness reducing phenomenon far exceeds the superfluous thickness (usual about 1 mm) for compensating the corrosion and a novel countermeasure is required.

The thickness reducing phenomenon of the shell, the heat exchanging pipes and the support plates in the heater is a phenomenon caused in the inside of the heater, so that it is difficult to observe the condition from the outside or it is impossible to conceive the condition at some place, and when the thickness reduction once occurs, the repair is very difficult or infeasible in view of the structure. Accordingly, the feed-water heater must be designed and manufctured with the materials not causing the thickness reduction to ensure the reliability of the plant.

The erosion-corrosion of the outer surface of the heat exchanging pipes occurs when the ambient temperature is about 100° C.-200° C., and there are water drops and a steam flow, the portion where the erosion-corrosion is generated, is noticeable at the outer circumferential portion of the pipe group, particularly the lowest portion of the most outer circumference of the pipe group and since the inlet side section of the feed-water where the water temperature in the heat exchanging pipes is low, is conspicuous in the steam consumption, the erosion-corrosion is severe. In particular, the erosion-corrosion concentrates at the lower portion of the outer circumference of the pipe group.

An object of the present invention is to provide the steel composition which is excellent in both weldability and erosion-corrosion resistance under wet steam, and the feed-water heater having a high reliability which is constructed with said steel.

It is apparent from the above described formulae of C equivalent and $P_{CM}$ value that the improvement of the weldability may be obtained by reducing C content but in such a case the hardness of the steel is naturally degraded, so that it is generally presumed that the erosion-corrosion resistance is deteriorated. It is desired that the E.C. resistance is not only more improved but also the weldability is improved rather than that the weldability is improved without deteriorating the E.C. resistance. For these demands, it is a general common sense of those skilled in the art that the reduction of C content is considered to be not proper and there has been no prior art that the E.C. resistance and the weldability are improved by the reduction of C content.

It has been considered that this problem is one difficult problem which cannot be overcome considering the economy under the present technical level and the above described agreement is obliged.

The inventors have made diligent studies systematically and fundamentally with respect to the relation of the C content and slight amount of alloying elements in these steels to the E.C. resistance, weldability and mechanical properties and found the unexpected following facts that the E.C. resistance in these Cr-Mo steels is improved.

(1) By reducing the upper limit of the C content to 0.14%, the E.C. resistance is improved.

(2) By addition of slight amounts of Cu and Ni, the E.C. resistance is noticeably improved.

(3) When the Si content is lower, the E.C. resistance is higher.

(4) In any case of (1), (2) and (3), even if the strength level is low, the E.C. resistance is excellent.

These facts are the unexpected discovery which is opposite to the common sense of the technical conception in the previous relative technic.

The inventors have applied these discovered facts to the steels used under wet steam, such as the above described feed-water heater and have accomplished the improvement in both the E.C. resistance and weldability which is a very difficult problem in such a use as mentioned above.

The first aspect of the present invention consists in a low C-Cr-Mo steel suitable to be used under wet steam, which has a composition consisting of 0.02–0.14% by weight (hereinafter, % means % by weight) of C, not more than 0.90% of Si, 0.30–0.80% of Mn, 0.70–1.60% of Cr, 0.40–0.70% of Mo and the remainder being substantially Fe.

The second aspect of the present invention consists in the low C-Cr-Mo steel having a composition consisting of a basic component (which is above described composition of the steel of the first aspect of the present invention) and a second component of at least one of not more than 0.5% of Cu, not more than 0.5% of Ni and not more than 0.005% of B, which elements serve to improve the strength of steel by solid-solution hardening and increase in hardenability. The second aspect aims to improve the strength of the steel of the first aspect so that the high weldability and E.C. resistance of the steel due to its low C content can be more improved, and further aims to improve E.C. resistance of the steel by the action of Cu or Ni itself.

The third aspect of the present invention consists in the low C-Cr-Mo steel having a composition consisting of the basic component and a third component of at least one of not more than 0.05% of Nb and not more than 0.08% of V, which elements are precipitation hardening type elements. The third aspect aims to improve the strength of the steel of the first aspect so that the high weldability of E.C. resistance of the steel due to its low C content can be more improved.

The fourth aspect of the present invention consists in the low C-Cr-Mo steel having a composition consisting of the basic component and a fourth component of at least one of Al, Ti and Zr in an amount of 0.005–0.80% in each element, which elements serve to form a fine microstructure in steel. The fourth aspect aims to improve the toughness of the steel of the first aspect so that the weldability and E.C. resistance of the steel can be more improved.

The fifth aspect of the present invention consists in the low C-Cr-Mo steel having a composition consisting of the basic component, the second component and the third component.

The sixth aspect of the present invention consists in the low C-Cr-Mo steel having a composition consisting of the basic component, the second component and the fourth component.

The seventh aspect of the present invention consists in the low C-Cr-Mo steel having a composition consisting of the basic component, the third component and the fourth component.

The eighth aspect of the present invention consists in the low C-Cr-Mo steel having a composition consisting of the basic component, the second component, the third component and the fourth component.

C, Cu and Ni are important elements in the present invention, and the C content is limited to 0.02–0.13%, and each of the Cu and Ni contents are limited to 0.16–0.30% as a preferable range for improving more remarkably the effect of the present invention in the second, fifth, sixth and eighth aspects among the above described aspects of the present invention.

The reason of the limitation of the range of the contents of the component elements in the steel of the above described aspects of the present invention is as follows.

C content is a most important requirement in the present invention, and must be limited to not more than 0.14% in order to decrease the weld hardenability and weld cracking sensitivity, to lower the preheating temperature for welding, to abbreviate the postheating, to lower the stress-relief annealing temperature and to obtain excellent E.C. resistance contrary to the conventional idea. The lower C content is the more desirable for improving the weldability. However, in order to obtain a steel having sufficiently high strength and toughness within the temperature range of from room temperature up to about 250° C. to be used under wet steam in a feed-water heater for a nuclear power generation plant and the like, at least 0.02% of C must be contained in the steel. Therefore, the lower limit of C content is limited to 0.02%.

The Cr-Mo steel having the composition according to the present invention has such a remarkably excellent property that the weld crack sensitivity can be considerably improved by very slight decrease in the C content. When the C content is decreased from 0.14% to 0.13%, the weld crack sensitivity can be considerably decreased without deteriorating noticeably the strength level. Accordingly, the upper limit of C content is preferred to be 0.13%, more preferred to be 0.11%.

Si is an effective element for increasing the strength of steel at room temperature and at high temperature. In the present invention, there is a risk of decreasing of the strength due to the strict limitation of C content for the purpose of developing fully the expected effect. Therefore, Si must be contained in a steel in an amount of not more than 0.90% in order to maintain a given strength inexpensively without the use of an increased amount of expensive elements of Mn, Cr, Mo and the like. The higher content of Si is more effective for improving the strength. However, when the Si content exceeds 0.90%, the toughness of the weld heat affected zone is deteriorated. Therefore, the Si content must be not more than 0.90%. Further, the inventors have found that, when the Si content is limited to not more than 0.45%, the E.C. resistance of the steel is remarkably improved independently of the low C content. Therefore, it is particularly preferable to limit the Si content to not more than 0.45% in the steels of the first to sixteenth aspects of the present invention. This limitation is one of the important requirements in the seventeenth and eighteenth aspects of the present invention. In the steel of the present invention, it is possible to secure the necessary strength by the action of strength-improving elements of Mn, Cr, Mo and the like even when the Si content is decreased to the above described low level. This fact will be explained later. Particularly preferable content of Si is 0.1–0.35%.

Mn is necessary in an amount of at least 0.30% in order to give strength and ductility to steel. However, the strength of a steel having the composition defined in the present invention is highly influenced by Cr and Mo rather than Mn. Therefore, it is not necessary to use a large amount of Mn in order to increase the strength of the steel of the present invention. When the Mn content exceeds 0.80, the weld hardenability of the steel is increased. Therefore, the Mn content is limited to 0.30–0.80%.

Cr and Mo are important elements for improving the E.C. resistance of steel against wet steam at high flow rate. In order to obtain a steel having a high E.C. resistance to be used in a feed-water heater for nuclear power generation plant and the like, it is necessary that a steel having the composition of the present invention contains at least 0.70% of Cr and at least 0.40% of Mo. The larger amount of Cr and Mo is more effective for improving the E.C. resistance. However, the use of more than 1.60% of Cr or more than 0.70% of Mo has a risk of deteriorating the formability and weldability of steel. Accordingly, the content of Cr is limited to 0.70–1.60%, and that of Mo is limited to 0.40–0.70%. Cr serves to form a high-strength microstructure as an element for improving the hardenability and further has a solid solution-strengthening action. Mo is a precipitation-hardening type element, and its fine carbides are dispersedly precipitated during the tempering treatment. Therefore, both Cr and Mo serve to improve the strength of steel and the above described effect can be properly developed within the above described limited range of each element.

As described above, the limitation of the contents of the basic elements of the present invention, that is, the contents of C, Si, Mn, Cr and Mo, is based on the same reason in the first to eighth aspects of the present invention, in the ninth to twelth aspects (preferred embodiments of the steel of the present invention), wherein the C content is strictly limited; in the thirteenth to eighteenth aspects, wherein the steel is used in a specifically limited apparatus; and in the nineteenth aspect, wherein the C content is strictly limited, and steel is used in a specifically limited apparatus.

In the second, fifth, sixth, eighth, fifteenth, sixteenth and eighteenth aspects of the present invention, not more than 0.5% of Cu or not more than 0.5% of Ni, or both of them are contained in a steel. The reason is that these elements can further improve the E.C. resistance of the steel against wet steam at high flow rate. Although these elements exhibit their effect when they are used alone, the effect is more significant when they are used in combination. The larger amounts of Cu and Ni are more preferable for improving the E.C. resistance of steel. However, when the amount of each of Cu and Ni exceeds 0.5%, the weldability of steel is noticeably decreased. Therefore, the upper limit of the content of each of Cu and Ni is limited to 0.5%. Moreover, Cu or Ni itself has a solid solution-strengthening action and improves the hardenability of steel, and therefore the strength of steel is improved by adding Cu and Ni singly or in combination to the steel. As described above, since the strength of steel can be improved by the use of Cu and Ni it is possible to decrease the C content by using Cu or Ni without deteriorating the stength of steel, and further the use of Cu or Ni serves to improve the E.C. resistance of steel. That is, the use of not more than 0.5% of Cu or not more than 0.5% of Ni not only improves the E.C. resistance of steel, but also serves to improve the strength of steel. Due to this strength-improving action, the C content in steel can be decreased. Therefore, the use of Cu or Ni is very effective for improving the E.C. resistance of steel in this point also.

B is an element capable of improving the hardenability of steel, and is occasionally used for improving the stength of steel. The strength-improving action of B makes possible to decrease the C content in a steel, and the presence of B in a steel serves to improve the E.C. resistance of the steel. The effect of B appears when the B content in a steel is not more than 0.005%. When the B content in a steel exceeds 0.005%, the steel is very poor in the weldability. Therefore, the B content is limited to not more than 0.005% in the steel of the present invention.

In order to attain the object of the present invention, it is preferable that the content of Cu in the steel of the present invention is at least 0.02%, that of Ni is at least 0.02% and that of B is at least 0.0002%.

The reason why not more than 0.05% of Nb or not more than 0.08% of V singly or in combination is contained in the steel of the present invention is as follows. Both Nb and V have a precipitation-hardening action and serve to strengthen steel. Particularly, Nb serves to strengthen steel through the formation of fine grains. Therefore, the use of these elements serves to increase the strength of steel, and makes possible to decrease the C content in steel without deteriorating the strength of the steel, and further acts to decrease the weld hardenability and weld crack sensitivity of the steel. However, when the amount of Nb exceeds 0.05% or that of V exceeds 0.08%, the crack sensitivity of the welded joint during stress-relief annealing is increased and the toughness of the heat affected zone by the welding is deteriorated. Therefore, the content of Nb is limited to not more than 0.05%, and that of V is limited to not more than 0.08%. It is preferable that the content of each of Nb and V is at least 0.005%.

Further, at least one of Al, Ti and Zr is contained in the steel of the present invention in an amount of 0.005–0.08% of each element. The reason is as follows. Al, Ti and Zr are formed into fine particles of AlN, TiN and ZrN respectively, and the fine particles serve to improve the toughness of steel by refining grains. The effect of these elements appears distinctly in an amount of at least 0.005%, and increases remarkably corresponding to the increase of the amount of these elements. However, the effect is saturated in an amount of about 0.08%. Therefore, the content of each of Al, Ti and Zr is limited to 0.005–0.08%.

In the steel of the above described preferred embodiments of the present invention, the content of C is limited to 0.02–0.13%, and at the same time the content of both Cu and Ni are limited to 0.16–0.30%. The reason is as follows. It is preferable that Cu or Ni is contained in a steel in an amount of at least 0.16% in order to improve the E.C. resistance of the steel. Higher content of Cu or Ni is more effective. However, the use of a smaller amount of Cu or Ni is rather preferable with respect to the weld crack sensitivity of steel, and it is desirable to use not nore than 0.30% of each of Cu and Ni. Therefore, it is preferable that the steel of the present invention contains C in an amount of not more than 0.13% and at least one of Cu and Ni in an amount of 0.16–0.30% in each element.

The steel of the present invention may contain incidental impurities in an amount contained during the ordinary steel making process. That is, S and P act to enhance the hot cracking sensitivity at the welded parts and therefore it is necessary that the content of each of S and P is limited to not more than 0.025%, which is the amount within the range contained during the ordinary steel making process. While, N acts to make crystal grains into a fine size in the presence of Al and serves to improve the toughness of steel. Therefore, N is effective when the N content in steel is 0.0020–0.0150% which is the amount within the range contained during the ordinary steel making process. However, when the N content exceeds 0.0150%, the property of the steel ingot is poor due to the formation of blow holes and other reason, and further the weldability of the steel is poor. Therefore, the N content should be limited to 0.0020–0.0150%.

The steel having the above described composition exhibits the above described excellent E.C. resistance, weldability, strength, toughness and the like when the steel is used under wet steam. Therefore, the steel is very valuable and has a high commercial merit when the steel is used in the field which requires the above described properties of steel. In other words, the present invention exhibits remarkably excellent effect in the quality of steel and further exhibits remarkably excellent commercial merit, only when the steel is used in the field which requires the above described properties of steel.

The composition of the steel of the present invention, the use thereof and the like have been hereinbefore explaned. The steel of the present invention is produced in the following method. That is, a molten steel having the above defined composition is produced and then subjected to a rolling or forging by a conventional method, and the rolled steel or forged steel is subjected to a normalizing followed by a tempering, or to an annealing, whereby an aimed steel is produced. In the present invention, the heat treatment is limited to the above described two kinds of treatments.

The term "normalizing" means a treatment, wherein a steel is heated up to a temperature of not lower than the $Ac_3$ point and then cooled in air (for example, a steel plate having a thickness of less than 100 mm is merely cooled in air, and a steel plate having a very large thickness of not less than 100 mm is cooled in air or is acceleratedly cooled). The term "tempering" means a treatment, wherein a steel is heated up to a temperature of not higher than the $Ac_1$ point and then cooled in air. The term "annealing" means a treatment, wherein a steel is heated up to a temperature of not lower than the $Ac_3$ point and then slowly cooled. The normalized and tempered steel has generally ferrite-pearlite microstructure, and sometimes contains bainite. The annealed steel has generally ferrite-pearlite microstructure.

As a typical embodiment of the apparatus to be used under wet steam, there is known a feed-water heater for nuclear power generation plant. An explanation will be made with respect to the use of the steel of the present invention in the feed-water heater. It is a very important property of the steel of the present invention that, when it is intended to use the steel as a steel for feed-water heater, "annealing" can be applied to the steel contrary to the conventional heat treatment, wherein "annealing" has never been used. Therefore, the steel of present invention has a very excellent merit as described hereinafter.

That is, an annealed steel is less sensitive for heat cycles, such as stress-relief annealing after welding and the like, and is smaller in the variation of microstructure and mechanical property than a normalized and tempered steel. Accordingly, when a considerably large amount of variation of temperature is forecast as in the case of, for example, a stress-relief annealing of a large-size size welded structure, it is preferable to use an annealed steel rather than a normalized and tempered steel in order to keep the quality of the parts of the structure uniform as possible. In spite of such merit of annealed steel, only a normalized and tempered steel has higherto been used in the feed-water heater for nuclear power generation plant and annealed steel has never hitherto been used in the heater. This is mainly due to the following reason. It has been considered that the annealed steel is lower in the strength and is noticeably lower in the E.C. resistance than the normalized and tempered steel. However, the inventors have made various investigations based on a technical idea entirely different from the conventional fixed idea, and ascertained that, according to the present invention, a steel having a low C content and high weldability can be produced; that a steel having the composition according to the present invention has a very high E.C. resistance even when the steel is subjected to an annealing as a heat treatment; and further that the steel has proper strength and toughness to be used as a steel for feed-water heater for nuclear power generation plant.

The following examples are given in order to more clarify the construction of the invention and concretely show the particular effects thereof.

The chemical compositions of steel specimens are shown in the following Tables 2 and 3.

In these tables, all specimens other than specimen Nos. 4-3, 4-4, 6-12, 16-10, 16-11 and 16-12 are steel satisfying the chemical compositions defined in the respective claim of the invention. While, the specimen Nos. 4-3 and 4-4 as a comparative example are commercially available high carbon 1¼Cr-½ Mo steels usually used in a feed-water heater for nuclear power generation as a typical example of equipments used under wet steam in Japan. In this conventional steel, C content is 0.16–0.17%, which is higher than the upper limit of 0.14% defined in the invention.

Moreover, the specimen Nos. 6-12 and 16-10 are so-called comparative steels showing that the erosion-corrosion resistance is insufficiently improved when the C content is outside the defined range of the invention, and the specimen Nos. 6-11, 16-11 and 16-12 are comparative steels using in the weldability test.

All of these steels other than the commercially available steels of the specimen Nos. 4-3 and 4-4 are steel plates, each being obtained by hot rolling 100 kg of a steel ingot, which is produced by iusing a small-size high frequency induction heating vacuum furnace, into a steel plate of 30 mm thick by means of a small-size rolling mill. After the rolling, the steel plate is subjected to an annealing treatment as well as a normalizing-temperature treatment usually applied to steel plates used in the feed-water heater for nuclear power generation.

The normalizing treatment is carried out by retaining steel plate in a heating furnace at 930° C. for 1 hour and then cooling it in air. The condition of tempering treatment is 660° C.×1 hr. Further, the annealing treatment is carried out by retaining the steel plate in a heating furnace at 930° C. for 1 hour and then slow cooling it at an average cooling rate of 0.8° C./ min over a range of 800° C. to 400° C.

Since the steel plate is always subjected to a stress relieve annealing treatment after the welding assembling, the normalized-tempered plate and annealed plate are further subjected to the stress relieve annealing treatment at 645° C. for 1 hour prior to the testing. However, the specimens used for the weldability test are not subjected to the stress relieve annealing treatment.

In order to prove that the steels according to the invention have proper strength and toughness as a steel plate used in the feed-water heater for nuclear power generation, tensile tests at room temperature and 250° C. and V-Charpy impact test are first made with respect to these specimens. Moreover, the term "proper strength" used herein means that the tensile strength is more than about 40 kgf/mm$^2$ at room temperature and also it is desired to maintain the value of more than 40 kgf/mm$^2$ even at 250° C. considering the heating temperature of the feed-water heaater of about 150° C., while the term "proper toughness" used herein means that the absorbed energy at 0° C. is more than about 2.1 kg.m considering the use conditions.

In the tensile test is used a bar specimen having a diameter of 6 mm, a parallel part length of 30 mm and a guage length of 25 mm, while in the V-Charpy impact test is used a specimen provided with a V-notch of 2 mm.

TABLE 2

(weight %)

| Specimen No. | | C | Si | Mn | P | S | Cu | Ni | Cr | Mo | V | Al |
|---|---|---|---|---|---|---|---|---|---|---|---|---|
| 1 | Composition of claims 1 and 13 | 0.11 | 0.60 | 0.51 | 0.014 | 0.003 | — | — | 1.02 | 0.57 | — | — |
| 2 | Composition of claims 2 and 9 | 0.11 | 0.60 | 0.51 | 0.015 | 0.004 | 0.20 | 0.20 | 1.42 | 0.57 | — | — |
| 3 | Composition of claim 3 | 0.11 | 0.64 | 0.55 | 0.013 | 0.006 | — | — | 1.38 | 0.56 | 0.016 | — |
| 4-1 | Composition of claims 4 and 14 | 0.10 | 0.70 | 0.61 | 0.012 | 0.007 | — | — | 1.46 | 0.58 | — | 0.016 |
| 4-2 | Composition of claims 4 and 14 | 0.13 | 0.70 | 0.62 | 0.014 | 0.008 | — | — | 1.40 | 0.55 | — | 0.018 |
| 4-3 | Comparative steel | 0.17 | 0.68 | 0.62 | 0.013 | 0.008 | — | — | 1.32 | 0.51 | — | — |
| 4-4 | Comparative steel | 0.16 | 0.61 | 0.51 | 0.014 | 0.005 | — | — | 1.44 | 0.57 | — | — |
| 5 | Composition of claims 5 and 10 | 0.13 | 0.64 | 0.55 | 0.012 | 0.007 | — | 0.22 | 1.44 | 0.53 | 0.025 | — |
| 6-1 | Composition of claims 6 and 15 | 0.10 | 0.65 | 0.60 | 0.012 | 0.008 | 0.11 | 0.11 | 1.42 | 0.57 | — | 0.017 |
| 6-2 | Composition of claims 6 and 15 | 0.14 | 0.69 | 0.61 | 0.013 | 0.007 | 0.20 | 0.20 | 1.43 | 0.56 | — | 0.014 |
| 6-3 | Composition of claims 6, 11, 15 and 19 | 0.12 | 0.70 | 0.62 | 0.013 | 0.007 | 0.20 | 0.19 | 1.44 | 0.57 | — | 0.014 |
| 6-4 | Composition of claims 6, 11, 15 and 19 | 0.13 | 0.69 | 0.61 | 0.012 | 0.008 | 0.19 | 0.21 | 1.11 | 0.56 | — | 0.014 |
| 6-5 | Composition of claims 6 and 15 | 0.14 | 0.70 | 0.61 | 0.011 | 0.008 | 0.20 | 0.20 | 1.09 | 0.57 | — | 0.015 |
| 6-6 | Composition of claims 6, 11, 15 and 19 | 0.10 | 0.69 | 0.61 | 0.013 | 0.007 | 0.20 | 0.21 | 1.46 | 0.56 | — | 0.015 |
| 6-7 | Composition of claims 6, 11, 15 and 19 | 0.09 | 0.69 | 0.61 | 0.013 | 0.007 | 0.20 | 0.20 | 1.46 | 0.56 | — | 0.016 |
| 6-8 | Composition of claims 6 and 15 | 0.12 | 0.69 | 0.62 | 0.013 | 0.007 | 0.20 | 0.50 | 1.43 | 0.56 | — | 0.017 |
| 6-9 | Composition of claims 6 and 15 | 0.07 | 0.65 | 0.60 | 0.013 | 0.008 | 0.35 | 0.35 | 1.43 | 0.55 | — | 0.014 |
| 6-10 | Composition of claims 6, 11, 15 and 19 | 0.07 | 0.69 | 0.61 | 0.012 | 0.007 | 0.20 | 0.20 | 1.44 | 0.56 | — | 0.017 |
| 6-11 | Comparative steel | 0.15 | 0.70 | 0.61 | 0.012 | 0.008 | 0.20 | 0.50 | 1.08 | 0.57 | — | 0.016 |
| 6-12 | Comparative steel | 0.16 | 0.56 | 0.55 | 0.004 | 0.006 | 0.14 | 0.14 | 1.37 | 0.53 | — | 0.023 |
| 7 | Composition of claim 7 | 0.13 | 0.64 | 0.61 | 0.012 | 0.006 | — | — | 1.41 | 0.57 | 0.047 | 0.014 |
| 8 | Composition of claims 8, 12, 16 and 19 | 0.11 | 0.69 | 0.61 | 0.012 | 0.007 | 0.20 | 0.21 | 1.43 | 0.55 | 0.034 | 0.018 |
| 9 | Composition of claims 6 and 15 | 0.12 | 0.63 | 0.61 | 0.012 | 0.005 | — | — | 1.40 | 0.57 | B: 0.0013 | 0.060 |

TABLE 3

(weight %)

| Specimen No. | | C | Si | Mn | P | S | Cu | Ni | Cr | Mo | V | Al |
|---|---|---|---|---|---|---|---|---|---|---|---|---|
| 11 | Composition of claims 1 and 13 | 0.13 | 0.20 | 0.60 | 0.014 | 0.004 | — | — | 0.81 | 0.55 | — | — |
| 12 | Composition of claims 2 and 9 | 0.12 | 0.25 | 0.62 | 0.013 | 0.007 | 0.18 | 0.22 | 0.98 | 0.55 | — | — |
| 13 | Composition of claim 3 | 0.12 | 0.23 | 0.58 | 0.014 | 0.006 | — | — | 1.05 | 0.54 | 0.026 | — |
| 14-1 | Composition of claims 4, 14 and 17 | 0.10 | 0.25 | 0.61 | 0.012 | 0.008 | — | — | 0.10 | 0.53 | — | 0.016 |
| 14-2 | Composition of claims 4, 14 and 17 | 0.06 | 0.25 | 0.62 | 0.012 | 0.008 | — | — | 1.10 | 0.53 | — | 0.015 |
| 15 | Composition of claims 5 and 10 | 0.12 | 0.28 | 0.62 | 0.014 | 0.008 | — | 0.22 | 1.00 | 0.53 | 0.020 | — |
| 16-1 | Composition of claims 6, 15 and 18 | 0.13 | 0.26 | 0.60 | 0.014 | 0.008 | 0.10 | 0.12 | 1.12 | 0.54 | — | 0.020 |
| 16-2 | Composition of claims 6, 11, 15, 18 and 19 | 0.13 | 0.25 | 0.61 | 0.013 | 0.008 | 0.19 | 0.20 | 1.11 | 0.54 | — | 0.016 |
| 16-3 | Composition of claims 6, 11, 15, 18 and 19 | 0.13 | 0.25 | 0.62 | 0.013 | 0.007 | 0.20 | 0.20 | 1.11 | 0.54 | — | 0.017 |
| 16-4 | Composition of claims 6, 11, 15, 18 and 19 | 0.10 | 0.25 | 0.61 | 0.011 | 0.008 | 0.20 | 0.21 | 1.11 | 0.53 | — | 0.016 |
| 16-5 | Composition of claims 6, 11, 15, 18 and 19 | 0.10 | 0.25 | 0.61 | 0.012 | 0.007 | 0.20 | 0.20 | 1.10 | 0.53 | — | 0.016 |
| 16-6 | Composition of claims 6, 11, 15, 18 and 19 | 0.11 | 0.25 | 0.62 | 0.012 | 0.008 | — | 0.20 | 1.09 | 0.53 | — | 0.015 |
| 16-7 | Composition of claims 6, 15 and 18 | 0.12 | 0.26 | 0.59 | 0.009 | 0.007 | 0.20 | 0.50 | 1.12 | 0.53 | — | 0.015 |
| 16-8 | Composition of claims 6, 11, | 0.08 | 0.25 | 0.62 | 0.012 | 0.006 | 0.20 | 0.21 | 1.10 | 0.53 | — | 0.016 |

TABLE 3-continued

| Specimen No. | | C | Si | Mn | P | S | Cu | Ni | Cr | Mo | V | Al |
|---|---|---|---|---|---|---|---|---|---|---|---|---|
| | | (weight %) | | | | | | | | | | |
| | 15, 18 and 19 | | | | | | | | | | | |
| 16-9 | Composition of claims 6, 15 and 18 | 0.08 | 0.28 | 0.60 | 0.014 | 0.008 | 0.35 | 0.35 | 1.08 | 0.56 | — | 0.022 |
| 16-10 | Comparative steel | 0.15 | 0.25 | 0.57 | 0.005 | 0.002 | 0.04 | 0.21 | 1.07 | 0.56 | — | 0.014 |
| 16-11 | Comparative steel | 0.15 | 0.25 | 0.62 | 0.014 | 0.006 | 0.20 | — | 1.05 | 0.54 | — | 0.016 |
| 16-12 | Comparative steel | 0.15 | 0.26 | 0.60 | 0.010 | 0.006 | 0.42 | 0.32 | 1.04 | 0.54 | — | 0.016 |
| 17 | Composition of claim 7 | 0.13 | 0.40 | 0.62 | 0.016 | 0.009 | — | — | 1.08 | 0.55 | 0.025 | 0.022 |
| 18 | Composition of claims 8, 12 and 16 | 0.11 | 0.26 | 0.62 | 0.012 | 0.008 | 0.20 | 0.20 | 1.09 | 0.54 | 0.034 | 0.017 |
| 10 | Composition of claims 6, 15 and 18 | 0.10 | 0.25 | 0.60 | 0.010 | 0.004 | — | — | 0.99 | 0.56 | B: 0.0012 | 0.066 |

The improved effect of weldability aiming at the invention is examined with respect to the typical steel specimens to be tested. In the weldability test, Y-groove restraint cracking test method according to JIS Z-3158 is used to measure a preheating temperature for prevention of weld crack.

Figure 2:
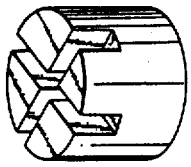
FIG. 2 is a perspective view of a test specimen used for the erosion-corrosion test.

Then, the test for erosion-corrosion resistance by spouting high temperature water at a high speed is made with respect to the typical steel specimens to be tested. In this case, the test specimen is a disc plate having a diameter of 9 mm and a thickness of 10 mm provided with a cruciform groove having a width of 3 mm and a depth of 5 mm as shown in FIG. 2. The weight loss of the test specimen by erosion-corrosion is measured by spouting a high temperature and high purity water simulated as a reactor water containing an oxygen of not more thn 5 ppb and heated at 150° C. to the crossed portion of the groove through a nozzle of 1 mm diameter located above the groove at a high streaming rate of 10 m/sec for 500 hours.

The thus obtained test results are shown in the following tables 4 and 5 and FIGS. 3–6.

TABLE 4

| Specimen No. | | Heat treatment* | Tensile test at room temperature: Yield point (kgf/mm²) | Tensile strength (kgf/mm²) | Elongation (%) | Tensile test at 250° C.: Yield point (kgf/mm²) | Tensile strength (kgf/mm²) | V-Charpy impact test: Absorbed energy at 0° C. ((kgf · m) | Y-groove cracking test Preheating temperature for prevention of weld crack (°C.) | Test for erosion-corrosion resistance Weight loss (mg/500 h) |
|---|---|---|---|---|---|---|---|---|---|---|
| 1 | Composition of claims 1 and 13 | N-T-SR | 30.9 | 47.3 | 35 | 23.3 | 42.0 | 13.5 | 100 | 5.7 |
| 2 | Composition of claims 2 and 9 | N-T-SR | 33.5 | 51.6 | 32 | 25.0 | 45.2 | 11.2 | 100 | 5.2 |
| 3 | Composition of claim 3 | N-T-SR | 34.8 | 52.5 | 30 | 27.2 | 47.0 | 8.2 | 100 | 5.6 |
| 4-1 | Composition of claims 4 and 14 | A-SR | 30.9 | 49.1 | 40 | 24.2 | 44.4 | 18.0 | 75 | 5.6 |
| 4-2 | Composition of claims 4 and 14 | A-SR | 31.5 | 51.2 | 38 | 25.0 | 46.6 | 20.2 | — | — |
| 4-3 | Comparative steel | N-T | 36.6 | 55.2 | 34 | 27.4 | 48.0 | 8.2 | 150 | 6.2 |
| 4-4 | Comparative steel | N-T | 36.0 | 54.6 | 35 | 27.2 | 47.6 | 7.4 | 200 | — |
| 5 | Composition of claims 5 and 10 | N-T-SR | 38.2 | 56.6 | 32 | 30.6 | 51.6 | 7.5 | — | — |
| 6-1 | Composition of claims 6 and 15 | A-SR | 31.2 | 50.2 | 33 | 28.2 | 48.0 | 20.5 | — | 5.4 |
| 6-2 | Composition of claims 6 and 15 | N-T-SR | 38.0 | 59.4 | 29 | 28.2 | 52.5 | 15.0 | — | 5.2 |
| 6-2 | Composition of claims 6 and 15 | A-SR | 30.9 | 53.2 | 36 | 24.3 | 48.2 | 8.4 | — | — |
| 6-3 | Composition of claims 6, 11, 15 and 19 | N-T | — | — | — | — | — | — | 100 | — |
| 6-4 | Composition of claims 6, 11, 15 and 19 | N-T-SR | 37.1 | 55.4 | 31 | 28.1 | 48.8 | 17.5 | — | — |
| 6-4 | Composition of claims 6, 11, 15 and 19 | A-SR | 33.0 | 52.3 | 35 | 26.0 | 47.8 | 11.1 | — | — |
| 6-5 | Composition of claims 6 and 15 | N-T | — | — | — | — | — | — | 125 | — |
| 6-6 | Composition of claims 6, 11, 15 and 19 | N-T-SR | 34.0 | 54.7 | 35 | 25.3 | 48.1 | 20.7 | — | — |
| 6-6 | Composition of claims 6, 11, 15 and 19 | A-SR | 33.1 | 51.4 | 35 | 26.5 | 46.0 | 17.3 | — | 5.0 |
| 6-7 | Composition of claims 6, 11, 15 and 19 | N-T | — | — | — | — | — | — | 100 | — |
| 6-8 | Composition of | N-T-SR | 38.1 | 59.6 | 30 | 31.9 | 52.6 | 14.0 | 125 | — |

TABLE 4-continued

| Specimen No. | | Heat treatment* | Tensile test at room temperature: Yield point (kgf/mm²) | Tensile strength (kgf/mm²) | Elongation (%) | Tensile test at 250° C.: Yield point (kgf/mm²) | Tensile strength (kgf/mm²) | V-Charpy impact test: Absorbed energy at 0° C. ((kgf · m) | Y-groove cracking test Preheating temperature for prevention of weld crack (°C.) | Test for erosion-corrosion resistance Weight loss (mg/500 h) |
|---|---|---|---|---|---|---|---|---|---|---|
| | claims 6 and 15 | | | | | | | | | |
| 6-9 | Composition of claims 6 and 15 | N-T-SR | 34.0 | 55.2 | 32 | 28.0 | 49.4 | 18.4 | 100 | — |
| 6-10 | Composition of claims 6, 11, 15 and 19 | A-SR | 31.1 | 47.7 | 40 | 24.8 | 43.2 | 27.0 | 75 | — |
| 6-11 | Comparative steel | N-T-SR | 40.9 | 61.9 | 28 | 34.3 | 54.8 | 12.8 | 150 | — |
| 6-12 | Comparative steel | N-T | 38.2 | 56.8 | 32 | — | — | 11.0 | — | 6.7 |
| 6-12 | Comparative steel | A-SR | 31.5 | 52.1 | 33 | — | — | 4.2 | — | 6.8 |
| 7 | Composition of claim 7 | N-T-SR | 40.3 | 62.6 | 25 | 36.0 | 54.2 | 15.8 | — | — |
| 8 | Composition of claims 8, 12, 16 and 19 | N-T-SR | 37.0 | 60.4 | 28 | 32.9 | 53.4 | 10.4 | — | — |
| 9 | Composition of claims 6 and 15 | N-T-SR | 46.2 | 60.5 | 23 | 40.0 | 53.5 | 19.5 | 125 | 5.6 |

*N—normalizing, T—tempering, A—annealing, SR—stress relieve annealing

TABLE 5

| Specimen No. | | Heat treatment | Tensile test at room temperature: Yield point (kgf/mm²) | Tensile strength (kgf/mm²) | Elongation (%) | Tensile test at 250° C.: Yield point (kgf/mm²) | Tensile strength (kgf/mm²) | V-Charpy impact test: Absorbed energy at 0° C. (kgf · m) | Y-groove cracking test Preheating temperature for prevention of weld crack (°C.) | Test for erosion-corrosion resistance Weight loss (mg/500 h) |
|---|---|---|---|---|---|---|---|---|---|---|
| 11 | Composition of claims 1 and 13 | N-T-SR | 29.0 | 43.6 | 38 | 20.5 | 38.5 | 12.0 | 100 | 5.0 |
| 12 | Composition of claims 2 and 9 | N-T-SR | 34.0 | 49.8 | 36 | 25.6 | 39.8 | 8.8 | 100 | 4.3 |
| 13 | Composition of claim 3 | N-T-SR | 36.2 | 51.2 | 36 | 28.0 | 43.2 | 11.8 | 100 | 4.7 |
| 14-1 | Composition of claims 4, 14 and 17 | A-SR | 28.3 | 43.3 | 41 | 21.0 | 40.9 | 28.5 | 75 | 4.0 |
| 14-2 | Composition of claims 4, 14 and 17 | A-SR | 25.4 | 40.4 | 44 | 17.3 | 37.0 | 33.8 | — | — |
| 15 | Composition of claims 5 and 10 | N-T-SR | 36.0 | 51.8 | 35 | 27.8 | 46.0 | 12.6 | — | — |
| 16-1 | Composition of claims 6, 15 and 18 | N-T-SR | 34.5 | 51.0 | 38 | 24.5 | 45.0 | 25.2 | — | 4.5 |
| 16-2 | Composition of claims 6, 11, 15, 18 and 19 | N-T-SR | 35.5 | 51.4 | 37 | 25.3 | 45.7 | 24.7 | — | 3.4 |
| 16-2 | Composition of claims 6, 11, 15, 18 and 19 | A-SR | 30.3 | 48.0 | 38 | 23.1 | 44.9 | 14.3 | — | — |
| 16-3 | Composition of claims 6, 11, 15, 18 and 19 | N-T | — | — | — | — | — | — | 100 | — |
| 16-4 | Composition of claims 6, 11, 15, 18 and 19 | N-T-SR | 33.2 | 47.9 | 40 | 25.0 | 41.9 | 34.0 | — | — |
| 16-4 | Composition of claims 6, 11, 15, 18 and 19 | A-SR | 29.3 | 45.4 | 38 | 22.8 | 42.3 | 25.2 | — | 3.9 |
| 16-5 | Composition of claims 6, 11, 15, 18 and 19 | N-T | — | — | — | — | — | — | 5.0 | — |
| 16-6 | Composition of claims 6, 11, 15, 18 and 19 | A-SR | 29.3 | 44.9 | 40 | 22.0 | 41.7 | 24.9 | — | 3.2 |
| 16-7 | Composition of claims 6, 15 and 18 | N-T-SR | 35.6 | 50.8 | 36 | 27.2 | 44.5 | 29.8 | 125 | — |
| 16-8 | Composition of claims 6, 11, 15, 18 and 19 | A-SR | 28.5 | 42.8 | 40 | 20.3 | 40.2 | 32.2 | 75 | — |
| 16-9 | Composition of claims 6, 15 and | N-T | — | — | — | — | — | — | 100 | — |

TABLE 5-continued

| Specimen No. | | Heat treatment | Tensile test at room temperature: Yield point (kgf/mm²) | Tensile strength (kgf/mm²) | Elongation (%) | Tensile test at 250° C.: Yield point (kgf/mm²) | Tensile strength (kgf/mm²) | V-Charpy impact test Absorbed energy at 0° C. (kgf · m) | Y-groove cracking test Preheating temperature for prevention of weld crack (°C.) | Test for erosion-corrosion resistance Weight loss (mg/500 h) |
|---|---|---|---|---|---|---|---|---|---|---|
| | 18 | | | | | | | | | |
| 16-10 | Comparative steel | N-T | 36.5 | 52.5 | 36 | — | — | 32.7 | — | 6.0 |
| 16-10 | Comparative steel | A-SR | 30.8 | 48.1 | 39 | — | — | 11.7 | — | 3.9 |
| 16-11 | Comparative steel | N-T | 36.6 | 51.8 | 36 | — | — | 26.6 | 175 | — |
| 16-12 | Comparative steel | A-SR | 32.6 | 50.0 | 38 | — | — | 10.8 | 150 | — |
| 17 | Composition of claim 7 | N-T-SR | 37.4 | 52.6 | 34 | 29.0 | 44.2 | 18.2 | — | — |
| 18 | Composition of claims 8, 12 and 16 | N-T-SR | 36.8 | 52.4 | 34 | 28.0 | 46.9 | 27.1 | — | — |
| 10 | Composition of claims 6, 15 and 18 | N-T-SR | 44.7 | 56.0 | 28 | — | — | 3.6 | 125 | 3.8 |

Figure 3:
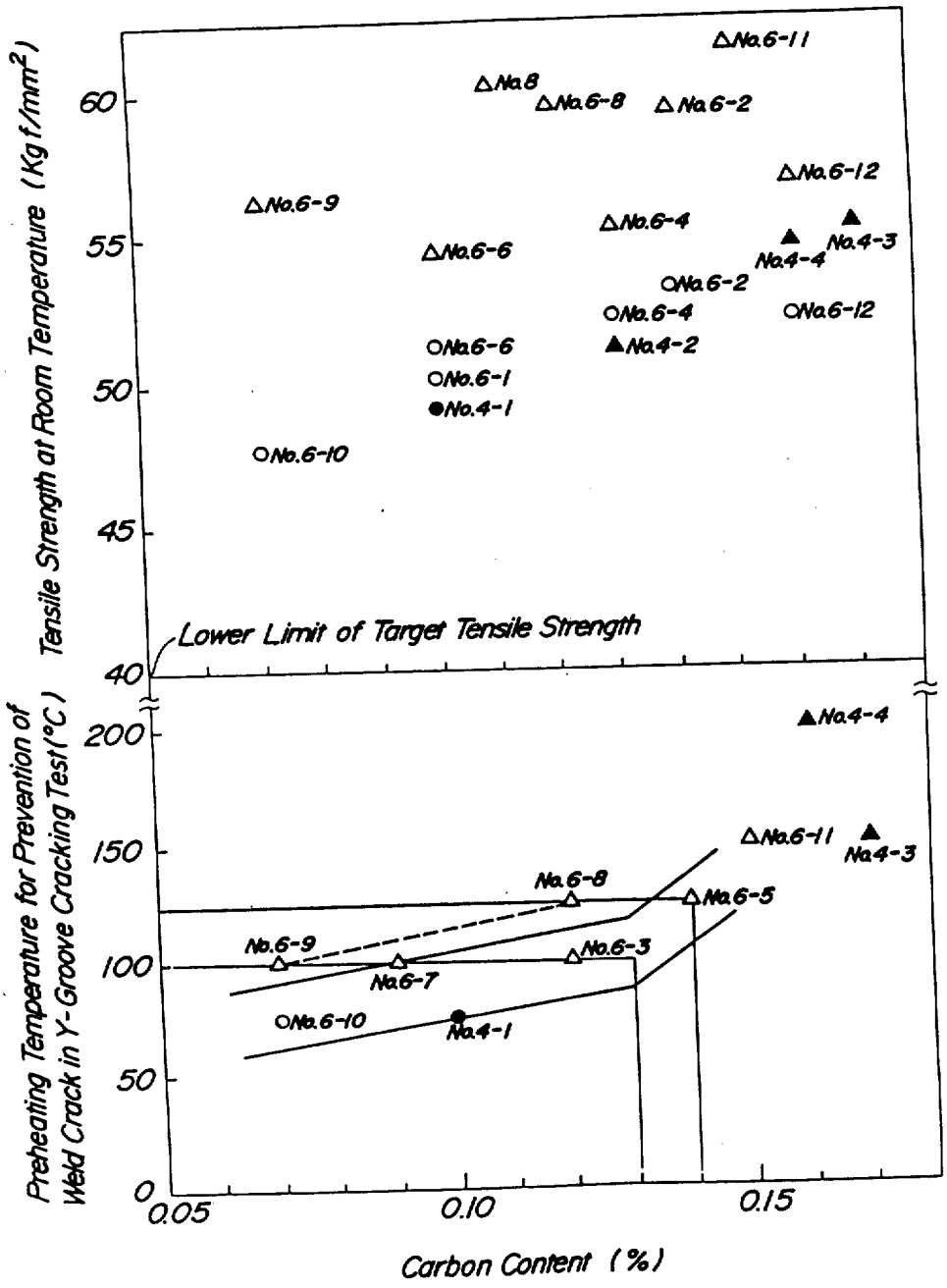
FIGS. 3 and 4 are graphs showing the relationships of the tensile strength at room temperature and the preheating temperature for the prevention of weld crack to the carbon content according to the invention, respectively.
Figure 4:
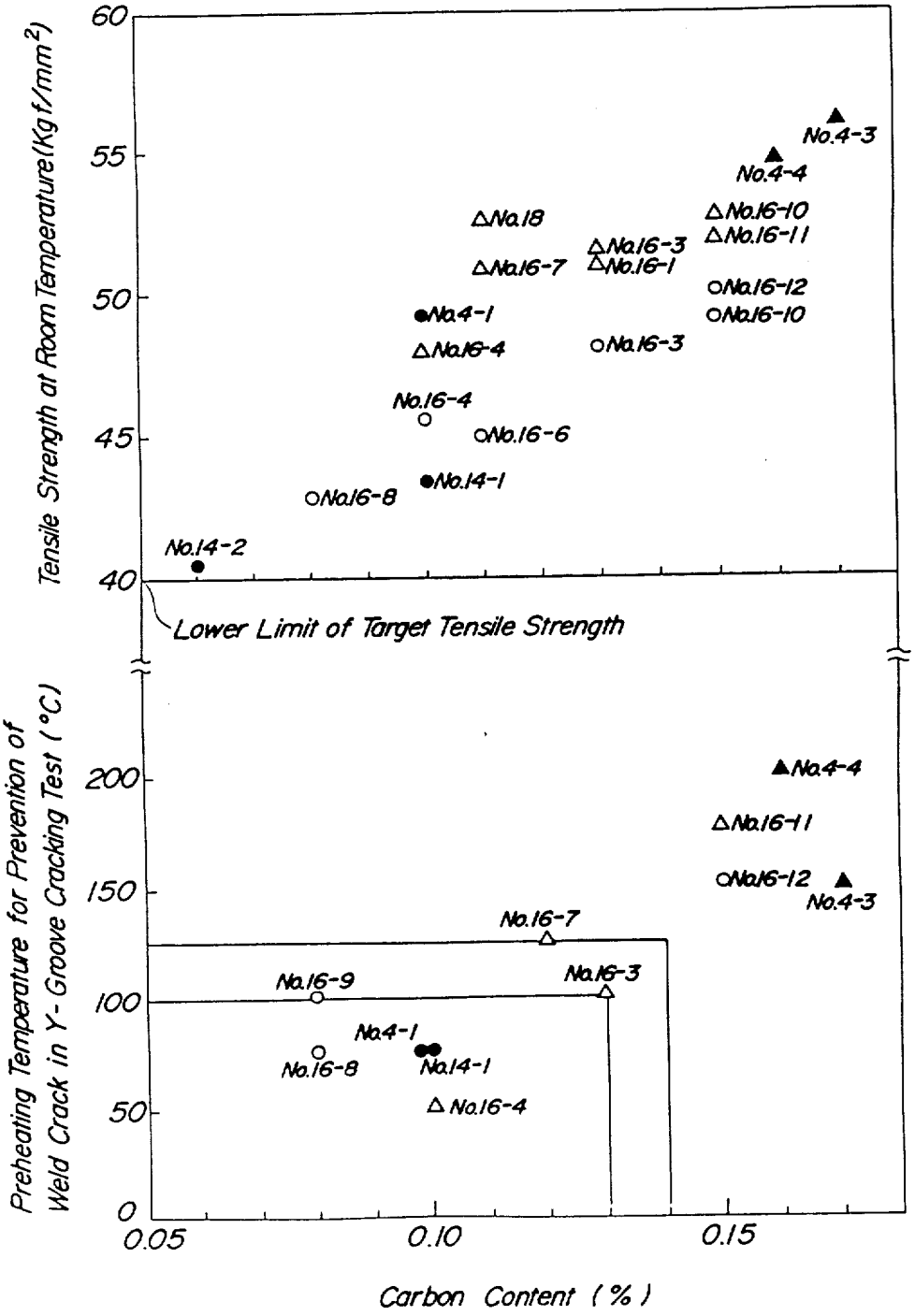

FIG. 3 shows the relationships of the tensile strength at room temperature and the preheating temperature for the prevention of weld crack in the welding to the carbon content in the steel specimens satisfying the chemical compositions as defined in the claims and the comparative steel specimens. FIG. 4 shows the same relationships as in FIG. 3 when the silicon content is limited to not more than 0.45%. In FIGS. 3 and 4, symbol represents normalized-tempered steel specimens containing no copper and nickel, symbol Δ represents normalized-tempered steel specimens containing copper and nickel, symbol • represents annealed steel specimens containing no copper and nickel, and symbol o represents annealed steel specimens containing copper and nickel.

From the data of Tables 4 and 5, it is obvious that all of the steel specimens according to the invention exhibit sufficiently high tensile strengths at room temperature and 250° C. and toughness suitable for use in the aforementioned application and also there is no problem relating to the strength even when the carbon content is reduced in order to improve the erosion-corrosion resistance and weldability. Further, it is a novel knowledge that even when the annealing treatment which hardly increases the strength is adopted instead of the normalizing-tempering treatment usually applied to the steel for the feed-water heater, the carbon content can be reduced considerably in view of the strength as compared with the case of the comparative steel specimen Nos. 4-3 and 4-4. Particularly, it is apparent from the data of Table 5 that the decrease of silicon content somewhat lowers the tensile strength at 250° C. but does not change the other properties and particularly the erosion-corrosion resistance is improved.

Then, the relationship between the carbon content and the weld cracking sensitivity will be described with reference to FIG. 3. The preheating temperature for the prevention of weld crack in the comparative steel specimens Nos. 4-3, 4-4 and 6-11, each having a carbon content exceeding the upper limit of the invention is 150°-200° C. On the contrary, according to the invention, the preheating temperature can be lowered to not higher than 125° C. by limiting the carbon content to not more than 0.14% and can further be lowered to not higher than 100° C., by limiting the carbon content to not more than 0.13% and each of the copper and nickel contents to not more than 0.30%.

As seen from the comparisons of the specimen No. 6-8 with the specimen No. 6-3 and the specimen No. 6-9 with the specimen No. b 6-10, slight increase in amounts of Cu and Ni largely exert upon the weld cracking sensitivity, which is quite contrary to the expectation under general technical level in this type of the steel. That is, the preheating temperature for the prevention of weld crack can be lowered by 25° C. by limiting each of the Cu and Ni contents to not more than 0.30% as compared with the case of steels containing each of the Cu and Ni contents of from more than 0.30% to not more than 0.50%.

In order to prevent the weld crack, the comparative steel specimens are required to be preheated at a higher temperature of at least 150°-200° C., while the steels defined in claims 4 and 6 are sufficient to be preheated to 125° C. at most. Particularly, the preheating temperature of the steel belonging to claim 11 may be not higher than 100° C. That is, the weld working can considerably be improved in the steels according to the invention.

Similarly, it can be seen from FIG. 4 that the steels defined in claims 17 and 18 are sufficient to be preheated to 125° C. at most and particularly the preheating temperature of not higher than 10° C. is sufficient in the steels belonging to claim 19.

Next, the relationship of each of the carbon, copper and nickel contents to the erosion-corrosion resistance will be described with reference to FIG. 5. From the comparison of the comparative steel specimen No. 4-3 with the specimen No. 4-1 belonging to claim 4, it is apparent that the reduction of C content is very effective for the improvement of the erosion-corrosion resistance. Further, it is clear from the comparison of the specimen No. 4-1 with the specimen Nos. 6-1, 6-6 and 6-2 belonging to claim 6 that the addition of Cu and Ni are effective for the improvement of this property and the larger the addition amount thereof, the higher the improvement effect. Moreover, it is obvious from the comparison No. 6-2 that it is necessary to limit the C content to not more than 0.14% in order to develop the improved effect of such property by adding slight amounts of Cu and Ni. From the above, it has been confirmed that the erosion-corrosion resistance of this type of Cr-Mo steel can considerably be improved by the reduction of C content, i.e. by limiting the C content as a steel for the feed-water heater to not more than 0.14% and also by adding slight amounts of Cu and Ni, preferably not less than 0.16% of each thereof.

Moreover, specimen No. 9 shown in Table 2 is a high toughness steel containing boron, which belongs to claim 6, and exhibits excellent weldability and erosion-corrosion resistance as seen from Table 4.

Figure 5:
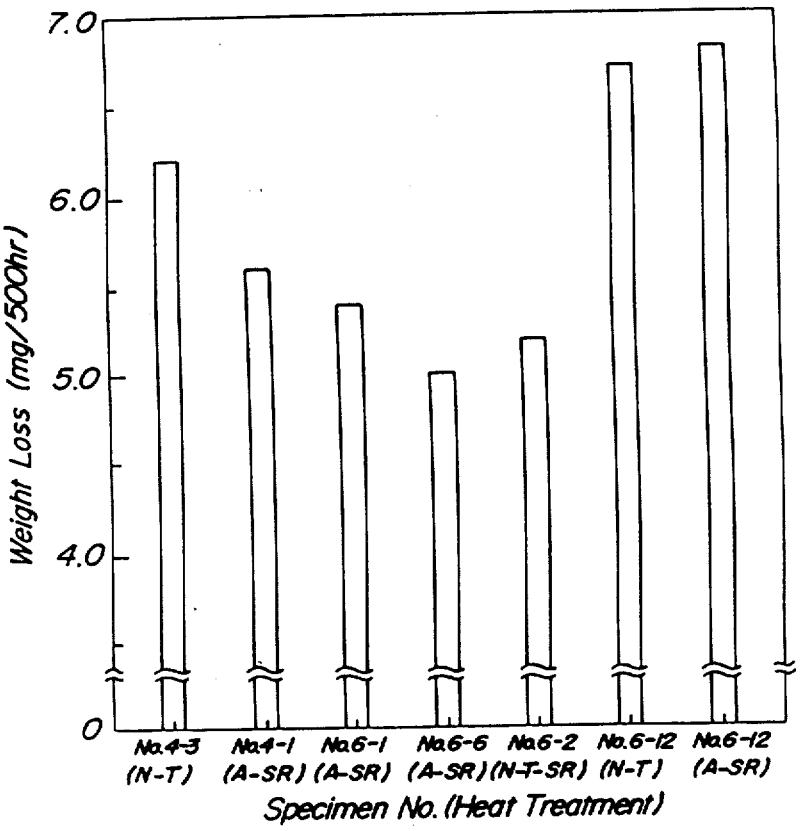
FIGS. 5 and 6 are graphs showing the influence of C, Cu, Ni and Si contents upon the erosion-corrosion resistance, respectively.
Figure 6:
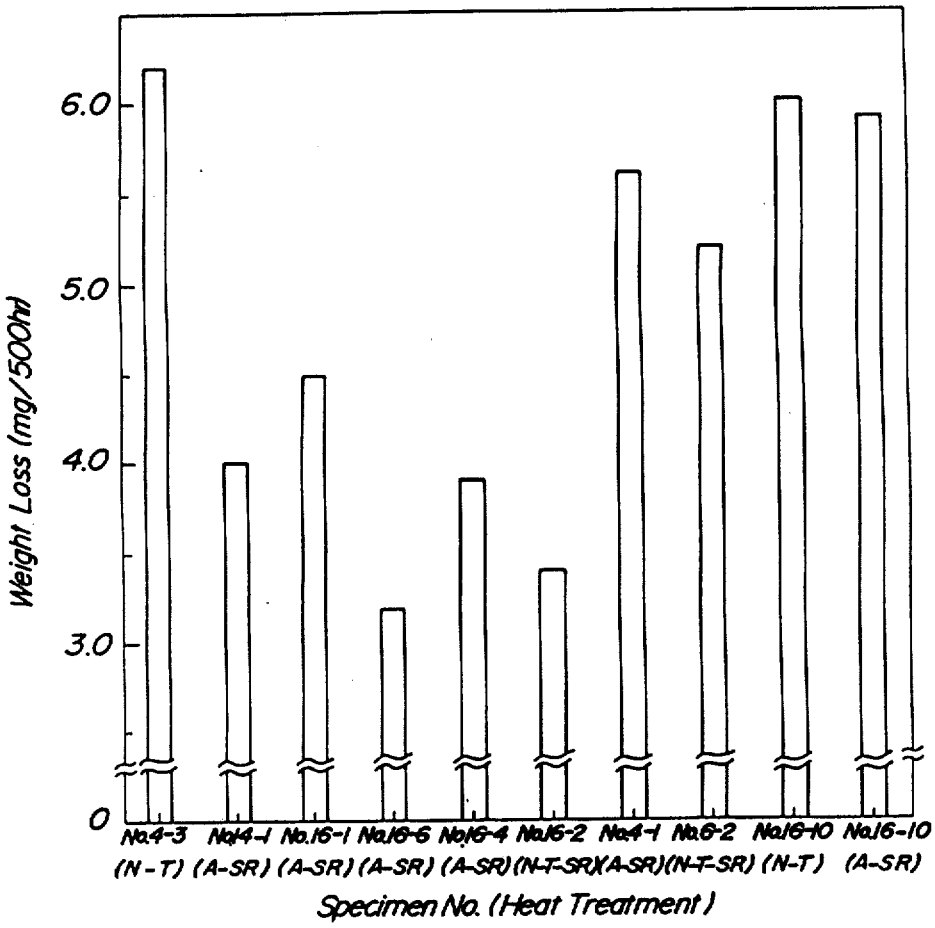

FIG. 6 shows the same relationship as in FIG. 5 when the Si content is limited to not more than 0.45%. As seen from FIG. 6, the more improvement of the erosion-corrosion resistance is achieved by reducing the Si content to not more than 0.45%.

Figure 7:
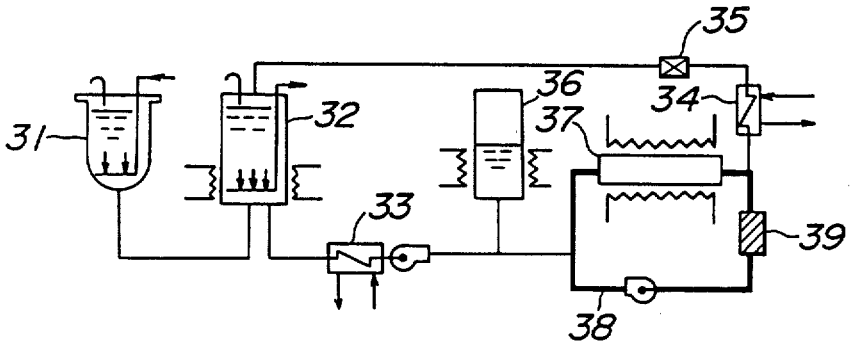
FIG. 7 is a schematic view of an embodiment of the corrosion testing apparatus used in the invention.

The erosion-corrosion resistance of Cr-containing low alloy steel is examined using a corrosion testing apparatus with a high temperature and high pressure water shown in FIG. 7.

The corrosion testing apparatus comprises a pure water tank 31, a deaeration tank 32, cooling units 33, 34, a demineralizer 35, a surge tank 36, a preheater 37, a testing loop 38 and a sample chamber 39.

As the sample to be tested, use is made of carbon steel SS41, steel SB46 containing about 0.5% of Cu, steel SB49M containing 0.5% of Mo, and low carbon-1 Cr-0.5Mo steel and low carbon-1¼Cr-0.5Mo steel according to the invention as shown in the following Table 6.

TABLE 6

| Kind of steel | C | Si | Mn | Cr | Mo | Cu |
|---|---|---|---|---|---|---|
| Carbon steel SS41 | 0.11 | 0.25 | 0.81 | — | — | — |
| Cu-containing steel SB46 | 0.27 | 0.24 | 0.83 | — | — | 0.49 |
| Steel SB49M | 0.31 | 0.27 | 0.83 | — | — | — |
| Low carbon-1Cr—0.5Mo steel | 0.14 | 0.35 | 0.45 | 1.01 | 0.51 | — |
| Low carbon-1¼Cr—0.5Mo steel | 0.13 | 0.55 | 0.50 | 1.24 | 0.55 | — |

In the testing apparatus, a saturated water heater at about 150° C. is circularly flowed to the sample in stead of the steam and waterdrop flowing state as an erosive-corrosive atmosphere. Considering the flow rates of steam and waterdrop, the flow rate of saturated water is set at 0.3 m/sec and 2 m/sec. The test results are shown in FIG. 8 in case of the flow rate of 0.3 m/sec and in FIG. 9 in case of the flow rate of 2 m/sec. respectively.

Figure 8:
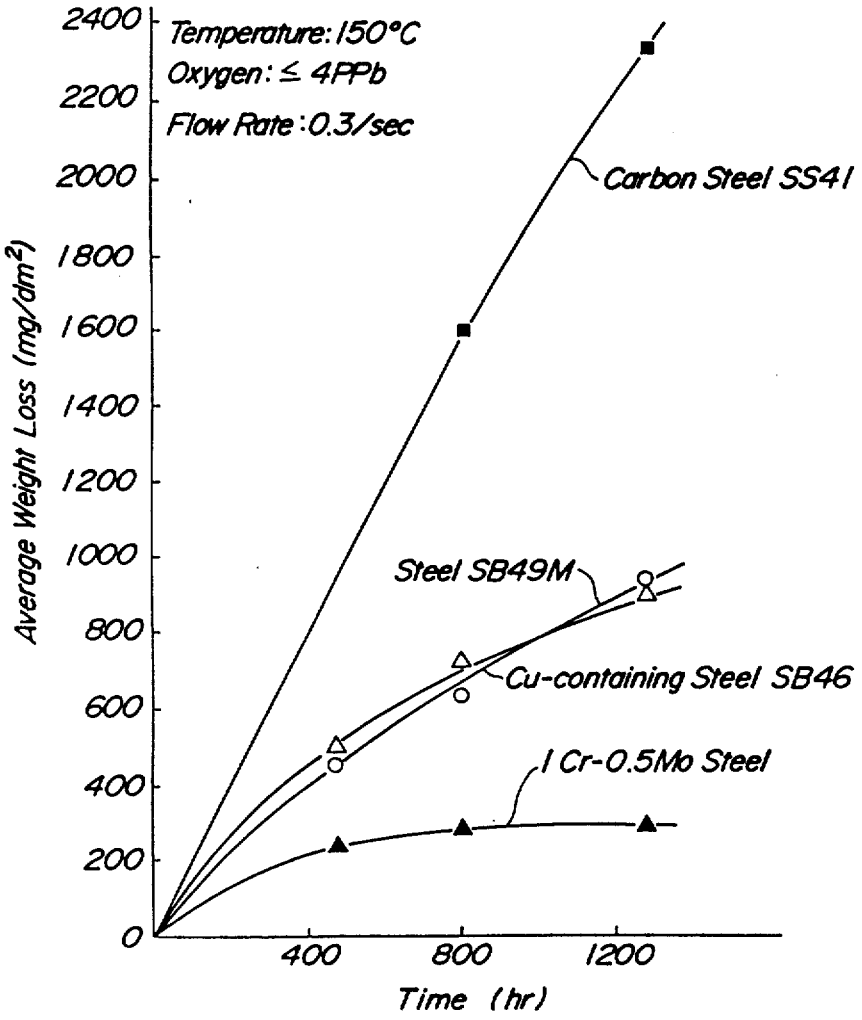
FIGS. 8 and 9 are graphs showing the test results obtained by using the testing apparatus of FIG. 7, respectively.
Figure 9:
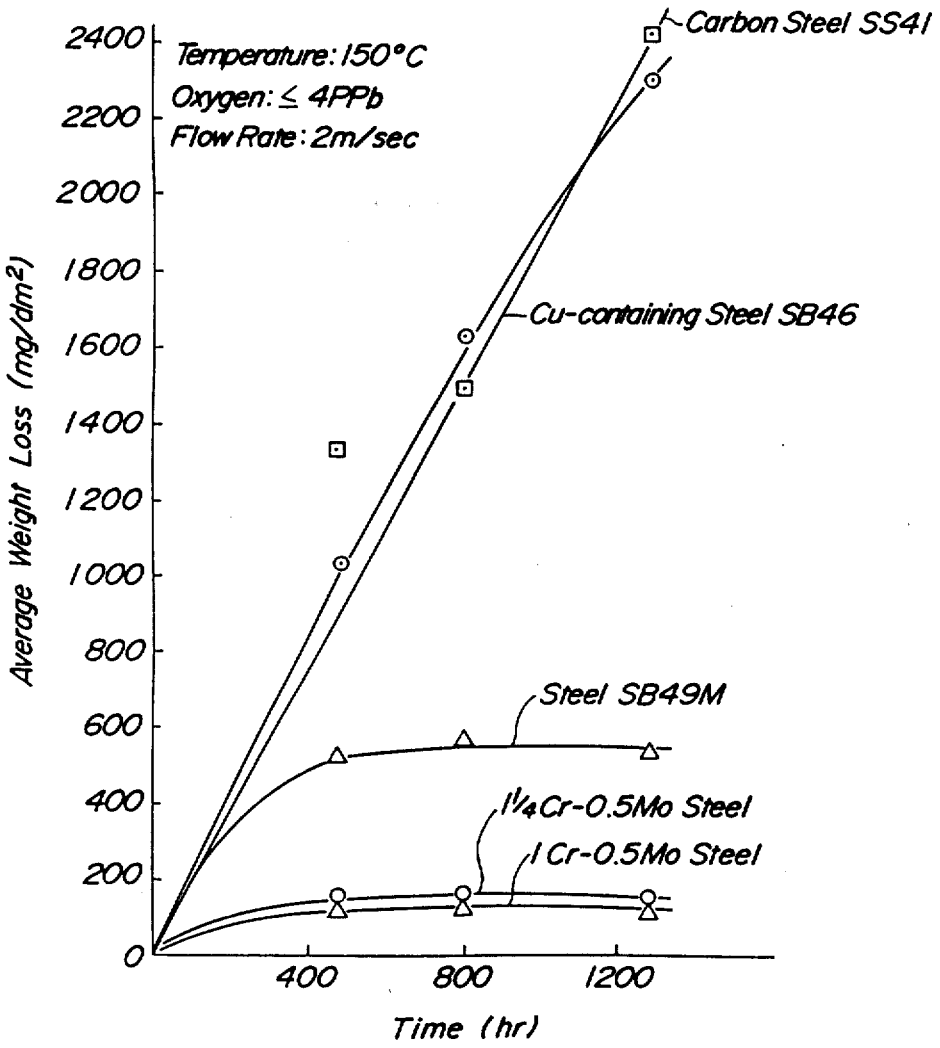

As seen from the test results of FIGS. 8 and 9, the saturation phenomenon of weight loss is observed in the Cr-Mo steels according to the invention. From this fact, it is ascertained that the chromium element is indispensable for the improvement of the erosion-corrosion resistance and that the steels according to the invention are very excellent in the erosion-corrosion resistance. Incidentally, when indicating the test results of FIG. 8 according to the control law of weight loss, the result as shown in the following Table 7 is obtained, from which it can be seen that the steels according to the invention have a fairly higher erosion-corrosion resistance as compared with the conventional carbon steel.

TABLE 7

| Kind of steel | Weight loss ($mg/dm^2$) | Control law of weight loss | Weight loss (mm/30 years) |
|---|---|---|---|
| Carbon steel SS41 | 2,300 | linear law | 57.8 |
| Cu-containing steel SB46 | 940 | linear law | 23.7 |
| Steel SB49M | 900 | parabolic law | 1.67 |
| Low carbon-1Cr—0.5Mo steel | 300 | logarithmic law | 0.082 |

Figure 10:
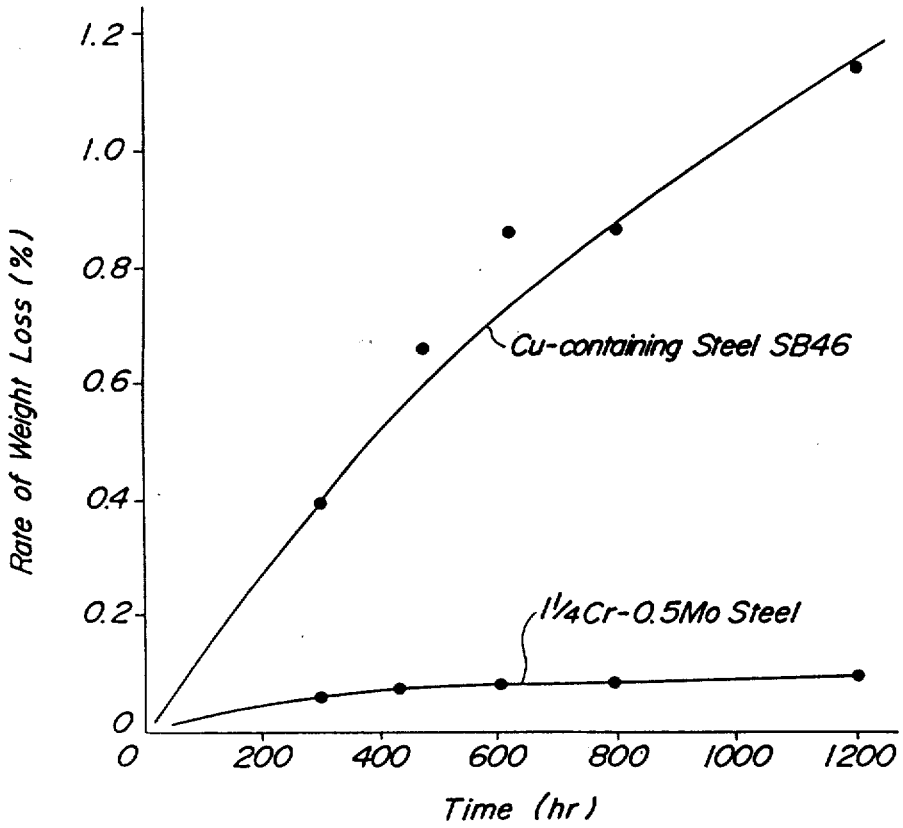
FIG. 10 is a graph showing a corrosion test result by another testing apparatus.

FIG. 10 shows a result of corrosion test under wet steam similar to the above mentioned corrosion test with a high temperature and high pressure water. In this test, the errosive-corrosive atmosphere is a steam and waterdrop flowing state, which is more close to the actual state inside the feed-water heater than that of the aforementioned testing apparatus.

The result of FIG. 10 is very close to the result of the test using the high temperature and high pressure water and shows that the low carbon 1¼Cr-0.5Mo steel according to the invention has an excellent erosion-corrosion resistance. Furthermore, the erosion-corrosion resistance of the steel according to the invention has been confirmed by performing the corrosion test in the actual plant wherein the same sample as used in the high temperature and high pressure water test is used in a pipe for wet steam.

By applying the steel according to the invention containing 0.7–1.60% of Cr, 0.40–0.70% of Mo and not more than 0.14% of C to the body of the feed-water heater, pipe and support plate used therefor, a fear of causing the erosion-corrosion in these parts can be avoided and a feed-water heater having a high reliability can be realized.

According to the invention, the preheating temperature in the welding may be 125° C. or lower, so that a fear of damaging the working environment becomes less and also an energy required for the preheating is low so as to reduce the energy cost. Furthermore, the erosion-corrosion resistance against wet steam of the steel according to the invention is considerably excellent, so that the life of vessels using such steel can be prolonged. Particularly, conspicuous effects can be achieved by applying the steel according to the invention to the feed-water heater for nuclear power generation.

What is claimed is:

1. In a feed-water heater comprising a water chamber provided with an inlet and an outlet for the feed-water flowing through the heater, heat exchanging tubes in which the feed-water exchanged and flowed to the outlet of the heater, support plates supporting the heat exchanging tubes at a proper distance and a shell into which heating fluids for heating the feed-water flowing in the heat exchanging tubes are introduced, the improvement comprising at least one of the heat exchanging tubes, the support plates and the shell is composed of a low C-Cr-Mo steel subjected to normalizing and tempering treatment and consisting of, in % by weight, 0.02–0.14% of C, not more than 0.90% of Si, 0.30–0.80% of Mn, 0.70–1.60% of Cr, 0.40–0.70% of Mo and the remainder being substantially Fe, and having a ferrite-pearlite microstructure.

2. In a feed-water heater comprising a water chamber provided with an inlet and an outlet for the feed-water flowing through the heater, heat exchanging tubes in which the feed-water charged into the heater through the inlet is heat exchanged and flowed to the outlet of the heater, support plates supporting the heat exchanging tubes at a proper distance and a shell in which heating fluids for heating the feed-water flowing in the heater exchanging tubes are introduced, the improvement comprising at least one of the heat exchanging tubes, the support plates and the shell is composed of a low C-Cr-Mo steel subjected to normalizing and tempering treatment and consisting of, in % by weight, 0.02–0.14% of C, not more than 0.90% of Si, 0.30–0.80% of Mn, 0.70–1.60% of Cr, 0.40–0.70% of Mo, at least one of Al, Ti and Zr in an amount of 0.005–0.08% in each element, and the remainder being substantially Fe, and having a ferrite-pearlite microstructure.

3. In a feed-water heater comprising a water chamber provided with an inlet and an outlet for the feed-water flowing through the heater, heat exchanging tubes in which the feed-water charged into the heater through the inlet is heat exchanged and flowed to the outlet of the heater, support plates supporting the heat exchanging tubes at a proper distance and a shell into which heating fluids for heating the feed-water flowing in the heat exchanging tubes are introduced, the improvement comprising at least one of the heat exchanging tubes, the support plates and the shell is composed of a low C-Cr-Mo steel subjected to normalizing and tempering treatment and consisting of, in % by weight, 0.02–0.14% of C, not more than 0.90% of Si, 0.30–0.80% of Mn, 0.70–1.60% of Cr, 0.40–0.70% of Mo, at least one of not more than 0.005% of B, at least one of Al, Ti and Zr in an amount of 0.005–0.08% in each element, and the remainder being substantially Fe, and having a ferrite-pearlite microstructure.

4. In a feed-water heater comprising a water chamber provided with an inlet and an outlet for the feed-water flowing through the heater, heat exchanging tubes in which the feed-water charged into the heater through the inlet is heat exchanged and flowed to the outlet of the heater, support plates supporting the heat exchanging tubes at a proper distance and a shell into which heating fluids for heating the feed-water flowing in the heat exchanging tubes are introduced, the improvement comprising at least one of the heat exchanging tubes, the support plates and the shell is composed of a low C-Cr-Mo steel subjected to normalizing and tempering treatment and consisting of, in % by weight, 0.02–0.14% of C, not more than 0.90% of Si, 0.30–0.80% of Mn, 0.70–1.60% of Cr, 0.40–0.70% of Mo, at least one of not more than 0.5% of Cu, not more than 0.5% of Ni and not more than 0.005% of B, at least one of not more than 0.05% of Nb and not more than 0.08% of V, at least one of Al, Ti and Zr in an amount of 0.005–0.08% in each element, and the remainder being substantially Fe, and having a ferrite-pearlite microstructure.

5. In a feed-water heater comprising a water chamber provided with an inlet and an outlet for the feed-water flowing through the heater, heat exchanging tubes in which the feed-water charged into the heater through the inlet is heat exchanged and flowed to the outlet of the heater, support plates supporting the heat exchanging tubes at a proper distance and a shell into which heating fluids for heating the feed-water flowing in the heat exchanging tubes are introduced, the improvement comprising at least one of the heat exchanging tubes, the support plates and the shell is composed of a low C-Cr-Mo steel subjected to normalizing and tempering treatment and consisting of, in % by weight, 0.02–0.14% of C, not more than 0.45% of Si, 0.30–0.80% of Mn, 0.70–1.60% of Cr, 0.40–0.70% of Mo, at least one of Al, Ti and Zr in an amount of 0.005–0.08% in each element, and the remainder being substantially Fe, and having a ferrite-pearlite microstructure.

6. In a feed-water heater comprising a water chamber provided with an inlet and an outlet for the feed-water flowing through the heater, heat exchanging tubes in which the feed-water charged into the heater through the inlet is heat exchanged and flowed to the outlet of the heater, support plates supporting the heat exchanging tubes at a proper distance and a shell into which heating exchanging tubes are introduced, the improvement comprising at least one of the heat exchanging tubes, the support plates and the shell is composed of a low C-Cr-Mo steel subjected to normalizing and tempering treatment and consisting of, in % by weight, 0.02–0.14% of C, not more than 0.45% of Si, 0.30–0.80% of Mn, 0.70–1.60% of Cr, 0.40–0.70% of Mo, at least one of not more than 0.5% of Cu, not more than 0.5% of Ni and not more than 0.005% of B, at least one of Al, Ti and Zr in an amount of 0.005–0.08% in each element, and the remainder being substantially Fe, and having a ferrite-pearlite microstructure.

7. The feed-water heater as claimed in claim 3, 4 or 6, wherein C is not more than 0.13%, Cu and Ni are 0.16–0.30%, in % by weight.

*8. In a feed-water heater comprising a water chamber provided with an inlet and an outlet for the feed-water flowing through the heater, heat exchanging tubes in which the feed-water charged into the heater through the inlet is heat exchanged and flowed to the outlet of the heater, support plates supporting the heat exchanging tubes at a proper distance and a shell into which heating fluids for heating the feed-water flowing in the heat exchanging tubes are introduced, the improvement comprising at least one of the heat exchanging tubes, the support plates and the shell is composed of a low C-Cr-Mo steel subjected to annealing treatment and consisting of in % by weight, 0.02–0.14% of C, not more than 0.90% of Si, 0.30–0.80% of Mn, 0.70–1.60% of Cr, 0.40–0.70% of Mo and the remainder being substantially Fe, and having a ferrite-pearlite microstructure.*

*9. In a feed-water heater comprising a water chamber provided with an inlet and an outlet for the feed-water flowing through the heater, heat exchanging tubes in which the feed-water charged into the heater through the inlet is heat exchanged and flowed to the outlet of the heater, support plates supporting the heat exchanging tubes at a proper distance and a shell in which heating fluids for heating the feed-water flowing in the heat exchanging tubes are introduced, the improvement comprising at least one of the heat exchanging tubes, the support plates and the shell is composed of a low C-Cr-Mo steel subjected to annealing treatment and consisting of, in % by weight, 0.02–0.14% of C, not more than 0.90% of Si, 0.30–0.80% of Mn, 0.70–1.60% of Cr, 0.40–0.70% of Mo, at least one of Al, Ti and Zr in an amount of 0.005–0.08% in each element, and the remainder being substantially Fe, and having a ferrite-pearlite microstructure.*

*10. In a feed-water heater comprising a water chamber provided with an inlet and an outlet for the feed-water flowing through the heater, heat exchanging tubes in which the feed-water charged into the heater through the inlet is heat exchanged and flowed to the outlet of the heater, support plates supporting the heat exchanging tubes at a proper distance and a shell into which heating fluids for heating the feed-water flowing in the heat exchanging tubes are introduced, the improvement comprising at least one of the heat exchanging tubes, the support plates and the shell is composed of a low C-Cr-Mo steel having been subjected to annealing treatment and consisting of, in % by weight, 0.02–0.14% of C, not more than 0.90% of Si, 0.30–0.80% of Mn, 0.70–1.60% of Cr, 0.40–0.70% of Mo, at least one of not more than 0.5% of Cu, not more than 0.5% of Ni and not more than 0.005% of B, at least one of Al, Ti and Zr in an amount of 0.005–0.08% in each element, and the remainder being substantially Fe, and having a ferrite-pearlite microstructure.*

*11. In a feed-water heater comprising a water chamber provided with an inlet and an outlet for the feed-water*

*flowing through the heater, heat exchanging tubes in which the feed-water charged into the heater through the inlet is heat exchanged and flowed to the outlet of the heater, support plates supporting the heat exchanging tubes at a proper distance and a shell into which heating fluids for heating the feed-water flowing in the heat exchanging tubes are introduced, the improvement comprising at least one of the heat exchanging tubes, the support plates and the shell is composed of a low C-Cr-Mo steel subjected to annealing treatment and consisting of, in % by weight, 0.02–0.14% of C, not more than 0.90% of Si, 0.30–0.80% of Mn, 0.70–1.60% of Cr, 0.40–0.70% of Mo, at least one of not more than 0.5% of Cu, not more than 0.5% of Ni and not more than 0.005% of B, at least one of not more than 0.05% of Nb and not moe than 0.08% of V, at least one of Al, Ti and Zr in an amount of 0.005–0.08% in each element, and the remainder being substantially Fe, and having a ferrite-pearlite microstructure.*

*12. In a feed-water comprising a water chamber provided with an inlet and an outlet for the feed-water flowing through the heater, heat exchanging tubes in which the feed-water charged into the heater through the inlet is heat exchanged and flowed to the outlet of the heater, support plates supporting the heat exchanging tubes at a proper distance and a shell into which heating fluids for heating the feed*water flowing in the heat exchanging tubes are introduced, the improvement comprising at least one of the heat-exchanging tubes, the support plates and the shell is composed of a low C-*Cr-Mo steel subjected to annealing treatment and consisting of, in % by weight, 0.02–0.14% of C, not more than 0.45% of Si, 0.30–0.80% of Mn, 0.70–1.60% of Cr, 0.40–0.70% of Mo, at least one of Al, Ti and Zr in an amount of 0.005–0.08% in each element, and the remainder being substantially Fe, and having a ferrite-pearlite microstructure.*

*13. In a feed-water heater comprising a water chamber provided with an inlet and an outlet for the feed-water flowing through the heater, heat exchanging tubes in which the feed-water charged into the heater through the inlet is heat exchanged and flowed to the outlet of the heater, support plates supporting the heat exchanging tubes at a proper distance and a shell into which heating exchanging tubes are introduced, the improvement comprising at least one of the heat exchanging tubes, the support plates and the shell is composed of a low C-Cr-Mo steel subjected to annealing treatment and consisting of, in % by weight, 0.02–0.14% of C, not more than 0.45% of Si, 0.30–0.80% of Mn, 0.70–1.60% of Cr, 0.40–0.70% of Mo, at least one of not not more than 0.5% of Cu, not more than 0.5% of Ni and not more than 0.005% of B, at least one of Al, Ti and Zr in an amount of 0.005–0.08% in each element, and the remainder being substantially Fe, and having a ferrite-pearlite microstructure.*

*14. The feed-water heater as claimed in claim 10, 11 or 13, wherein C is not more than 0.13%, Cu and Ni are 0.16–0.30%, in % by weight.*

* * * * *